United States Patent [19]
Brown et al.

[11] 3,802,949
[45] Apr. 9, 1974

[54] METHOD FOR THE PRODUCTION OF AN INTEGRAL SKIN

[75] Inventors: Godfrey Neil Brown, Herne Bay; James Stephen Hill, Welwyn Garden City, both of England

[73] Assignee: Imperial Chemical Industries Limited, London, England

[22] Filed: Sept. 20, 1971

[21] Appl. No.: 182,150

[30] Foreign Application Priority Data
Sept. 23, 1970 Great Britain................... 45289/70

[52] U.S. Cl. ...... 161/160, 260/2.5 L, 260/29.6 WQ, 264/48, 264/53, 264/92, 264/236, 264/321, 264/DIG. 13, 264/DIG. 14, 264/DIG. 17, 264/DIG. 18

[51] Int. Cl. ...... B29d 27/04, B32b 5/18, C08f 3/68, C08f 45/68

[58] Field of Search ............. 264/46, 49, 53, 48, 92, 264/236, 321, DIG. 13, DIG. 14, DIG. 17, DIG. 18; 260/2.5 M, 47 C, 29.6 PM, 2.5 L, 29.6 WQ

[56] References Cited
UNITED STATES PATENTS

| | | |
|---|---|---|
| 2,160,054 | 5/1939 | Bauer et al..................... 260/2.5 M |
| 2,976,576 | 3/1961 | Wichterle et al. ..................... 264/49 |
| 3,505,281 | 4/1970 | Hodge............................... 260/47 C |
| 3,511,808 | 5/1970 | Hodge et al....................... 260/47 C |
| 3,654,193 | 4/1972 | Seiner............................... 264/41 X |
| 3,669,728 | 6/1972 | Seiner.......................... 260/29.6 PM |

OTHER PUBLICATIONS

Leitheiser, R. H.; C. C. Peloza; and Harold E. Ferrin, "Water–Extended–Polyester Resin," in SPB Journal, October 1969, Vol. 25, pp. 41–45.

*Primary Examiner*—Philip E. Anderson
*Attorney, Agent, or Firm*—Cushman, Darby & Cushman

[57] ABSTRACT

A method for making a cellular article having an integral skin of substantially non-cellular material, comprising emulsifying water with a water-insoluble liquid monomer to form an emulsion having an aqueous disperse phase, polymerising the liquid monomer to form a cellular polymer, drying the outer layer of said polymer and fusing said layer to form a skin. Unsaturated polyesters of a bisphenol A epoxy-modified glycol are the preferred emulsifiers when used in quantities from 0.3 to 5 percent by weight of the monomer, particularly when used in combination with a base reactive therewith.

11 Claims, No Drawings

METHOD FOR THE PRODUCTION OF AN INTEGRAL SKIN

The invention relates to water-extended polymeric material, and the provision of an integral non-cellular skin thereon.

According to the invention, a method is provided for making a cellular article having an integral skin of substantially non-cellular material over at least part of its surface, comprising: emulsifying water with a water-immiscible liquid monomer polymerisable to a thermoplastic material in the presence of an emulsifier therefor to form an emulsion having an aqueous disperse phase, polymerising the liquid monomer to form a cellular polymer, drying the outer layer of said polymer over at least part of its surface, applying heat and pressure to said layer to raise its temperature above the softening point of the polymer and fuse said layer, and cooling the fused layer to form a non-cellular skin.

Suitable liquid monomers include for example styrene, acrylic and methacrylic esters and vinyl acetate, either singly or as mixtures of monomers. Monomers such as vinyl chloride and vinylidene chloride, which exist in the gaseous state at room temperature, can be subjected to superatmospheric pressure to liquefy them in order that the emulsification and subsequent polymerisation can then be carried out. The preferred liquid monomer comprises at least 50 percent by weight of methyl methacrylate, and for polymerisation at ambient temperatures as hereinafter described, it is further preferred to use methyl methacrylate as the sole monomer.

The proportion of water which is used in the emulsion, depends mainly on the density desired in the final cellular material after the water has been removed therefrom. Emulsions containing 50 percent by weight of water produce cellular material which is sufficiently extended for many purposes, and stable emulsions are generally easier to produce with these lower water contents. Where the production of a very low density material is the most important requisite, however, the largest proportion of water consistent with the formation of a stable emulsion is used. For example, we find that emulsions containing 80 percent by weight of water may readily be prepared by suitably selecting the emulsifiers. We generally prefer that the emulsion contains at least 70 percent by weight of water, and water contents as high as 90 percent by weight have been obtained using our preferred emulsifiers as specified hereinafter. The maximum quantity of water which can be incorporated into the emulsion while retaining stability, depends partly on the viscosity which in turn is affected by other materials present, as will be discussed further hereinafter.

Although the disperse phase is preferably water, solutions of inorganic or organic substances in water may be used, the water may contain a water-soluble dyestuff for example. The incorporation of organic materials such as the lower alcohols, saccharides and formamides have also also been previously proposed for stabilising emulsions, and such additives may be introduced as aqueous solutions in the present emulsions provided they do not affect the ability of the thermoplastic material to flow when heated. This could be affected, for example, by cross-linking brought about by the presence of compounds having more than one polymerisable ethylenic double bond.

It has previously been suggested that for forming water-in-oil emulsions, suitable emulsifiers are polymers such as polymethyl methacrylate and polystyrene, which are soluble in the liquid monomer and which will form a turbid phase on adding a few drops of water to the solution. However, to obtain emulsions which are sufficiently stable to withstand polymerisation conditions with very high water contents, we prefer to use polyesters, particularly unsaturated polyesters. Unsaturated polyesters formed by reacting a diol with an unsaturated dicarboxylic acid, are generally particularly effective emulsifiers, but on water-extended polymers formed using sufficient unsaturated polyesters to provide a stable emulsion, it was found to be exceedingly difficult to form a good skin by the present method, and this was believed to be due to cross-linking caused by the unsaturation of the polyester. Reduction of the concentration of polyester in order to minimise the effect of cross-linking, also generally reduced the effectiveness of the emulsifying action to such an extent that high water content emulsions could not be made sufficiently stable to enable the monomer to be polymerised and produce a consistently fine cellular structure. More generally, the emulsions collapsed long before polymerisation had occurred.

However, as an exception to this generality, we found that certain polyesters based on bisphenol A (i.e. 2,2-bis-(4-hydroxy phenyl)propane) could be used in sufficiently small quantities to allow a skin to be formed, but which were sufficiently powerful emulsifiers to enable an emulsion to be obtained which was stable during polymerisation. The minimum quantity of emulsifier which was required for forming a stable emulsion depended to some extent on the prevailing conditions. In particular, the presence of other polymers dissolved in the liquid monomer enabled less polyester to be used, while on the other hand, higher polymerisation temperatures required a more stable emulsion. Generally, about 0.3 percent by weight of monomer was the lowest concentration with which we were able to obtain satisfactory results with our preferred polyesters. The greater the quantity of polyester used, the greater was the difficulty found in forming the skin, and so the maximum quantity of polyester which could be tolerated for skin formation depended very much on the depth of skin and ease of skin formation required. A practical maximum concentration of unsaturated polyester has been found to be about 5 percent by weight of monomer, although a working maximum of 2 percent by weight is preferred.

Accordingly, our preferred method is one in which the emulsifier comprises an unsaturated polyester of a bisphenol A epoxy-modified glycol and one or more ethylenically unsaturated dicarboxylic acids, the quantity of polyester lying within the range 0.3 to 5 percent by weight of monomer.

The preferred glycol is propylene glycol, and in particular the emulsifier is an unsaturated polyester of dipropoxylated bisphenol A, having the formula:

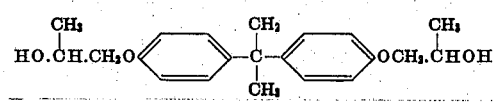

The acid component of the polyester is preferably an α,β-unsaturated α,β-dicarboxylic acid or a mixture of two or more of such acids. Fumaric and maleic acids are particularly suited, and we find that a mixture of fumaric and maleic acids in the ratio of 1:3 provides a polyester which is particularly suitable because of its availability. Our preferred polyesters are crystalline solids, but these may conveniently be dissolved in methyl methacrylate or styrene, and added to the reaction mixture in that form.

The ease with which a stable emulsion may be obtained, depends also on the acid number of the polyester. Polyesters having a higher acid number produce a stable emulsion much more readily than do polyesters having a lower acid number. For emulsions containing smaller quantities of water the effect of the acid number is diminished. However, for emulsions containing large quantities of water, particularly those containing at least 70 percent by weight of water, we prefer to use polyester emulsifiers having an acid number of at least 25 mg potassium hydroxide per 1 g polyester. We have found polyesters very suitable having an acid number of about 65 mg potassium hydroxide per 1 g polyester.

Additional emulsifying agents or stabilisers may be employed if desired, and in particular it is preferred to add a basic compound when employing our preferred polyester emulsifiers. Suitable basic compounds include, for example, potassium hydroxide and ethanolamines such as triethanolamine. While the higher quantities of polyester may provide sufficient stability in low water-content emulsions to provide a fine-celled foam without the addition of a base, as the emulsifier concentration is decreased and the water content is increased, the presence of the base becomes increasingly important. Thus without the basic compound, the instability of the emulsion becomes increasingly apparent, for example, by a coarsening of the cellular structure, as the polyester content is reduced. As the amount of basic compound is increased so the number of acid groups on the polyester which are thereby neutralised increases, and the efficiency of the combined polyester/base as an emulsion stabiliser increases. Amounts of basic compound in excess of that required to neutralise all the acids, does not provide any noticeable increase in stability, and it is therefore preferred to add the basic compound in amounts sufficient to substantially neutralise the acid groups of the polyester.

Polymeric materials may also be added to the mixture in order to modify the properties of the final material or to reduce the time required to effect the polymerisation. In the latter case, the preferred additional polymers are the polymerised product of the monomers used, e.g. a polymethyl methacrylate for use with methyl methacrylate monomer. The additional polymer may be added either before or after emulsification as desired, dependent on the requirements of the emulsion.

Increasing water content increases the viscosity of the emulsion, and viscosity is one factor limiting the maximum quantity of water which can be incorporated. While polymer dissolved in the liquid monomer might assist in stabilising the emulsion, it also increases the viscosity. It will be seen therefore that the presence of added polymer before emulsification takes place reduces the amount of water which can be incorporated. Thus for example, when using emulsifiers which normally enable about 90 percent of water to be incorporated in the absence of additional polymer, emulsions in which the continuous phase contains up to 20 percent by weight of a high molecular weight polymer such as polymethyl methacrylate may generally contain a maximum of only about 70 percent by weight of water because of the increased viscosity. The maximum water content is further reduced by further quantities of dissolved polymer. For this reason, we prefer to limit polymer which is added to the mixture before emulsification, to amounts less than 40 percent by weight of the continuous phase, because at that order of concentration the emulsion tends to become very viscous and difficult to manipulate. Amounts of polymer up to 20 percent by weight of the continuous phase we have found to be sufficient for most purposes. These figures, however, may be varied by variation of the polymer, and higher quantities of polymer can be incorporated in an emulsion by dissolving some or all of the polymer in the monomer after the emulsion has been formed. A particularly convenient method of obtaining the additional polymeric material is to partially cure the monomer before adding the other components, i.e. before adding the emulsifier and the aqueous phase.

The emulsion may generally be prepared merely by vigorous stirring of the water in the presence of the liquid monomer with its dissolved polyester emulsifier, and any other further stabilising agents which may be added as desired. The size of the cells is determined by the size of the water droplets present in the emulsion as the monomer polymerises, and for any given composition the size of water droplets is dependent on the shear applied during stirring, and also on the efficiency of the emulsifier used. For most purposes for which these materials may be employed, we prefer the material to have cells of small diameters, that is materials in which at least 95 percent of the cells have the diameter less than 7 $\mu$m, preferably less than 5 $\mu$m, and especially where at least 90 percent of the cells are less than 2 $\mu$m in diameter.

In forming the non-cellular skin from the cellular material, there will be a consequent reduction in volume as the cells are collapsed. The formation of an even skin may therefore be controlled by the use of a heated mould whose volume contracts during the process, thereby applying and sustaining a positive pressure on the cellular material, generally for a short time interval. The pressure should be less than that required to crush the cold cellular core, which pressures for polyester emulsified methyl methacrylate polymers are of the order of 70 bar. Under easy glazing conditions, only light pressures of about 0.5 bar may be required. For simple shapes such as flat sheets, the mould may likewise be simple, comprising for example merely two flat plates of which at least one is capable of being heated. Alternatively the sheets may be pressed between rollers, at least one of which is heated, generally several pairs of rollers being required to give sufficient residence time at an economical rate of throughput.

The ease with which the skin may be formed on the polymerisation product of any given emulsion, depends on the polymerisation conditions employed. Thus a greater difficulty in skin formation will be found with materials polymerised at elevated temperatures and a relative small catalyst concentration, compared with materials polymerised in a rapid reaction at ambient temperatures using relatively high concentrations of free radicals. By way of illustration, an emulsion of 70 percent by weight of water in methyl methacrylate using 5 parts by weight of dipropoxylated bisphenol A fumarate/maleate polyester and 1 part by weight of triethanolamine in 100 parts by weight of methyl methacrylate, when cured at 80°C in about 3 hours using benzoyl peroxide catalyst, would only produce a poor matt-surfaced skin even when using pressures approaching those sufficient to crush the cellular material (i.e. approaching about 70 bar) and temperatures considerably in excess of the degradation temperature (i.e. in excess of about 175°C). For comparison, a second portion of the same emulsion was polymerised at room temperature using benzoyl peroxide and dimethyl-p-toluidine accelerator in a cure time of about 1 hour, and the resultant material was provided with a clear glossy skin about 0.5 mm thick by pressing for about 20 sec between two flat plates at 160°C, the weight of the upper plate giving a pressure of about 0.7 bar.

The ease of glazing appears to be a function of the molecular weight, and is affected by the number of free radicals available for initiating the reaction. Thus the provision of large quantities of free radicals by using large quantities of catalyst or by using an accelerator, provides a material on which a skin may be readily obtained, i.e. by the use of low temperatures and low pressures. The reaction is exothermic, and too many free radicals may cause loss of control of the reaction, and the temperature will then rise until the mixture boils. This is indicated by the meniscus becoming convex or by the volume of the curing emulsion suddenly increasing. In the final polymer, the loss of control during polymerisation is evidenced by a coarse cell structure.

Thus where ease of skin formation is the prime requisite, sufficient free radicals are required to provide a fast reaction, since even small quantities of catalysts will cause polymerisation if given sufficient time, but the product will be difficult to provide with a skin. By the term "fast reaction" we means that the polymerisation is complete within 1.5 hour, periods as low as 30 to 40 min being preferred. However, it is important that the speed of the reaction be determined by the number of available free radicals rather than by adjustment of the temperature, and hence predominantly ambient temperatures are desirable. We find temperatures within the range 10° to 50°C are generally suitable. Using the above derivations of controlled reaction and of rapid reaction, our preferred processes are therefore those in which the polymerisation is initiated at a temperature within the range 10° to 50°C in the presence of sufficient free radicals to provide a rapid but controlled reaction.

The most suitable catalyst depends on the monomer used and on the temperature at which the monomer is to be polymerised, but it must be a catalyst capable of operating in the presence of water. For example, peroxy catalysts such as benzoyl peroxide and methylethylketone peroxide are generally suitable. A preferred catalyst is tert-butyl perpivolate which has a lower initiation temperature than the aforementioned peroxides, and hence enables the exothermic reactions to be controlled more readily. The preferred quantities of catalyst depend on the polymerisation temperatures and on the thickness of the casting in that for a given initiation temperature, smaller quantities of catalyst are preferred for use with the thicker sections in order that the exothermic heat may be removed at a rate sufficient to maintain control over the reaction. For example, using a tert-butyl perpivolate for catalysing a polyester-emulsified methyl methacrylate emulsion containing about 80 percent by weight of water, we find that suitable catalyst concentrations for an initiation temperature of about 50°C are of the order of 0.3 percent by weight of monomer for a 50 mm thick section, which quantity may be increased to about 1.3 percent by weight for a section of only about 12 mm thickness.

Dependent on the catalyst used, accelerators may also be added to the mixture. When using benzoyl peroxide under hot aqueous conditions, accelerators are not generally required. Where elevated temperatures are not desired, by using an activator such as dimethyl-p-toluidine or dimethyl aniline, in conjunction with a peroxy catalyst such as benzoyl peroxide, sufficient free radicals may be obtained for a rapid reaction without the application of heat.

The ability to form a skin may also be improved by copolymerising the monomer with monoethylenically unsaturated comonomers which provide internal plasticisation. The use of acrylates, particularly those providing the polymer chain with bulky side groups, are well-known modifiers for use with methyl methacrylate polymers. They have been used, for example, as a plasticising monomer for assisting in the shaping of polymer sheet by vacuum-forming techniques. We now find that these lubricating properties may also be applied to assist in the fusion of the material for the formation of a skin according to the present invention. Copolymerised alkyl acrylates, generally provide an increasing effect with increasing carbon atoms in the alkyl group, which preferably contains from two to 10 carbon atoms, larger alkyl groups tending to have adverse effects on the physical properties of the polymer. The quantity of acrylate required for a given improvement depends largely on the size of the alkyl group. We generally prefer to use the acrylate in quantities of from 5 to 20 percent by weight of the total monomers, particularly within the range of 10 to 15 percent by weight. Our preferred acrylate is 2-ethyl-hexyl acrylate, this being an acrylate which is readily available, and usually provides a substantial improvement in the ease of glazing while maintaining good physical properties such as resistance to weathering. It also enables higher polymerisation temperatures to be used.

The cell-forming water is initially encapsulated in the polymerised material and where the cells are filled with water no glazing can take place. The water, however, tends to slowly diffuse to the outer surfaces of the article where it evaporates leaving an air-filled porous structure. Where a freshly prepared cellular polymer filled with water is allowed to dry out sufficiently to reach equilibrium with the atmosphere, (about 4 weight percent water in polymethyl methacrylate), it is sufficiently free of water to enable the skin to be formed. Hence by specifying that the polymer is to be dry when forming the skin, it is intended that the free water within the cellular structure be removed, but it is not intended to indicate that the drying should be sufficiently rigorous to remove the moisture which would normally be present under equilibrium conditions. The drying process may be speeded up by suitable means of desiccation such as the application of heat to the polymerised material, by placing it in a dry atmosphere, or, particularly in the case of opened-cell material, by applying a vacuum thereto. Loss of water may be particularly rapid with methacrylate polymers. Thus in order to obtain a non-cellular skin by the process of the invention, the outer layer may be dried before the skin-forming heat is applied thereto, merely by allowing the water to evaporate on standing, or steps may be taken to speed up the removal of the water, as desired. Since only the dried cellular material will form a skin, it is possible to control the depth of skin by controlling the depth of the layer from which the water is removed. However, we prefer to remove water in excess of the layer to be fused, and to control the skin formation by suitable adjustment of the pressure, time and temperature of the heated plates or other skin-forming means, or by using stops limiting their travel.

For large objects, such as doors, it is generally preferable to cast the cellular polymer in the size and shape of the finished article. However, for smaller articles such as decorative tiles, it may be more convenient to cast the cellular polymer as a large block which is cut into smaller pieces which are subsequently provided with an integral skin by fusing the outer layer. Because of the greater exposed surface of the smaller pieces, we prefer to carry out the drying operation after the large block has been cut into the smaller pieces.

The extended polymeric material may also contain fillers, e.g. glass fibres, or colouring matters. For example, an emulsion containing about 70 percent by weight of water had a continuous phase formed from 5 parts by weight of polyester, 1 part by weight of triethanolamine and 100 parts by weight of methyl methacrylate. This was filled with 6 mm high strand-integrity glass fibre in various amounts up to 10 percent by weight of the continuous phase. The emulsion was cured at room temperature using benzoyl peroxide catalyst and dimethyl-p-toluidine accelerator and it was glazed using two plates heated to 150°C. A skin was formed but a poorer surface finish was obtained compared with that obtainable in the absence of glass fibres. However, the glass fibres increased the flexural strength and modulus.

By adjustment of the conditions, the process of the invention may be used to provide a skin adapted to fulfil one or more of a number of functions. Thus the skin may impart a greater strength and rigidity to the article. Similarly, where the material is relatively soft and easily scored on account of its cellular structure, the skin provides a much stronger surface having greater resistance to scoring. Alternatively, the provision of the skin may be entirely or partly for aesthetic considerations, for example by the application of a glaze or the sealing thereon of a pattern or ornament.

The value of a skin formed according to the process of the present invention may readily be demonstrated by the manner in which a sheet of the extended material may be moulded. Where a sheet of water-extended polymer having no integral skin is moulded by any of the usual thermoforming processes such as vacuum-forming or blow-moulding, in which at least part of the surface of the sheet is stretched, we have found that the stretched part tends to crack as the cells are ruptured. However, where an integral skin is first provided, this may be stretched above its softening point and then cooled to produce a moulded article having a continuous surface. Furthermore, we have found that cellular sheets of water-extended polymer having an integral skin on both faces are particularly suited to being shaped by known techniques such as blow-moulding or vacuum-forming where particularly even thicknesses were obtained with deep-drawn mouldings.

As a further aspect of the invention, therefore, we provide a method of moulding a sheet of a water-extended polymer by shaping it at a temperature above its softening point where at least part of the surface of the sheet is stretched, comprising first forming an integral skin by the method of the present invention on at least that part of the surface where stretching occurs.

By this method relatively large mouldings such as car bonnets and boot lids having smooth and strong surfaces may be made relatively cheaply with respect to their rigidity on account of the extended nature of the materials. Shaped articles which have been shaped from a cellular sheet of water-extended polymer having an integral non-cellular skin on both faces even when deep drawn during moulding, are particularly strong because of their even thickness. For example, wash basins and shower trays have been vacuum-formed from such sheet and have required no further reinforcement. Commercial mouldings formed from non-cellular polymethyl methacrylate sheet containing substantially the same quantity of polymer may require reinforcement such as fibre glass sprayed onto the hidden surface together with a binding polyester resin.

From the aesthetic standpoint, a glaze may be applied to the cellular article by applying a light pressure in a mould as hereinabove described or by a set of rollers having glazed surfaces. Thus for example, flat sheet may be glazed by forming the skin between two glazing plates employing pressures in the region of $7 \times 10^4$ $Nm^{-2}$ although pressures of 14 bar at temperatures about 160°C are generally preferred. Although the skin clearly takes up the surface details of the heated mould, we have found when using methyl methacrylate polymers for example, that surface features formed during the original casting and polymerisation of the emulsion, could be retained. Thus, where the emulsion was cast in a wooden mould which imparted wood grain detail to the cellular material as it polymerised, subsequent glazing at 160°C for about 20 sec at about 14 bar pressure produced a glossy surface in which the details of the wood grain were clearly visible.

Other patterns or ornamentation may similarly be sealed into the surface of the article if they are applied to the cellular material before the formation of the skin. Water-extended polymeric material may be printed upon or painted, the degree of absorption of the applied ink or paint depending on the nature and porosity of the material. As a further aspect of our invention, we therefore provide a method in which a decorative pattern or ornament is applied to the surface of the polymer prior to the surface layer being fused to form an integral skin. We generally prefer to add 4 percent by weight of methacrylic acid as a co-monomer to improve dye reception by providing more open cells.

This process may therefore be used for example in the production of decorative tiles. The decoration may be applied either by printing for the mass production of such tiles, or by individually decorating the tiles where an original result is desired.

A printed decoration on a carrier, such as a picture printed on paper, may also be applied to the cellular article during the formation of the skin. To do this, the printed original is placed between the heated mould and the cellular article before heat is applied thereto to form a skin. On cooling the article and removing the print carrier, the ink is retained within the surface. Thus for example, using a sheet of extended polymethylmethacrylate under the same conditions as previously described, a printed picture was transferred from a printed paper to the sheet. The printed paper was first lightly sprayed with a solvent for the ink and placed between the polymeric cellular sheet and the heated plate. A sheet of 'Melinex' polyethylene terephthalate film was inserted between the paper and the plate to keep the latter clean, and heat (160°C) and pressure 14 bar applied for about 20 sec. After cooling and washing off the paper, a matt surface was produced which retained a reversed image of the picture with good clarity and retention of colour. The original paper was destroyed in the process. This transference of a printed image may be applied generally to any such cellular material on which a non-cellular surface is formed according to the present invention.

Examples of the solvent which may be sprayed onto the paper are cellulose acetate, methylmethacrylate, butyl acetate and styrene, and of these we prefer cellulose acetate. Although a solvent is not essential for the transference of the image, we found that there was less certainty of obtaining good results if the solvent was omitted. After transference of the image, the matt surface may be retained, or a glaze applied by re-heating the surface.

This ability to receive and retain print provides a use for the process which is an extension to that described above for the formation of decorative tiles. Thus although direct printing onto the surface of the cellular material is to be preferred where a sharp image is desired, the image may be applied by means of a paper carrier where direct printing is not practicable. Moreover, the present process also provides a means for mounting pictures and the like onto cellular boards, in which the frame may be integrally moulded when the cellular boards are cast and polymerised. This single stage process provides a simple and cheap alternative to the multi-stage process employed previously and which comprised the stages of (i) mounting the print on a board, (ii) applying a protective finish to the print, (iii) constructing a frame and (iv) applying the mounted print to a frame.

The surface of the material may also be decoratively embossed, either alone or in conjunction with the transfer of a print, and fine features may readily be applied without disturbing the cellular nature of the core. Thus for example, where a print is transferred to the material from a thin flexible paper by pressing between two heated plates, if a piece of canvas or other coarsely woven material is placed between the flexible paper and the heated plate, the surface of the final article will be embossed with a pattern corresponding to that of the woven material. Where the same pattern is to be embossed on large numbers of articles, the heated plate may itself have formed thereon the negative of a shape to be embossed, thereby removing the necessity for the repeated insertion of the woven material or the like. The embossing process may be alternatively carried out subsequently to the transfer of a print, or indeed, in the absence of any print or other pattern. In each case, the heated rollers may be employed as an alternative to the use of heated plates, allowing a continuous process instead of the batch processes described above.

The following Examples are provided as illustrations of the present invention.

EXAMPLE 1

A syrup of polymethylmethacrylate in methyl methacrylate was prepared by slowly adding 21 parts by weight of a low molecular weight polymethylmethacrylate ('Diakon' MG 101) to 64 parts by weight of methyl methacrylate maintained at 60°C with vigorous stirring. When cool, the emulsifier and catalyst were added, and comprised 5 parts by weight of polysiloxane polyoxy alkalene copolymer, emulsifier (E.P. 6186), 10 parts by weight of amyl acetate, stabiliser, and 2 parts by weight of benzoyl peroxide, catalyst.

To 200 g of mixture, 300 m³ of water were slowly added using a "Silverson" high shear emulsifying mixer. A further 0.8 parts by weight of dimethyl-p-toluidine were added and the mixture poured into a shallow wooden tray which had been previously waxed polished. After approximately 45 min, the emulsion had polymerised to form a sheet of approximately 13 mm thickness, which was demoulded. It was noticed that the bottom surface had acquired a wood grain texture from the surface of the mould. The sheet was then dried in an oven at 70°C for 72 hour and was then pressed at 160°C for approximately 10 sec using 'Melinex' polyethylene terephthalate film as a release agent. The sheet was allowed to cool and the film peeled off to give a highly polished consolidated skin, but where the wood grain pattern was still clearly discernible.

EXAMPLE 2

A syrup was prepared from 90 parts by weight of methyl methacrylate, 10 parts by weight of polymethylmethacrylate ('Diakon' MG 101), 1.5 parts by weight of propoxylated bisphenol A unsaturated polyester having an acid number of about 65 mg potassium hydroxide per 1 g polyester ("Atlac" 382E) and 2 parts by weight of benzoyl peroxide and 2 parts by weight of triethanolamine.

To 750 g of this mixture (15 percent) was slowly added 4250 g of water (85 percent) with vigorous mixing using a "poppy head" emulsifier. A very viscous emulsion was formed, and 0.2 parts by weight of dimethyl-p-toluidine was added and stirred in by hand using a spatula. The emulsion was quickly deaerated under a vacuum of 26 inches mercury for 10 min. After approximately 1 hour, emulsion had polymerised to a hard block which was demoulded from the vessel and cut into slices 2.5 cm thick using a saw. The slices were dried for 48 hour in an oven at 90°C. A slice was taken and pressed at 14 bar at 160°C between 'Melinex' polyethylene terephthalate film for approximately 10 sec. On cooling, the film was stripped off leaving a thin consolidated highly polished surface skin.

EXAMPLE 3

A syrup was prepared as in Example 2 with the exception that only 0.5 parts by weight of the emulsifier were employed. The syrup was again emulsified with water but was only extended to 70 percent. After the addition of dimethyl-p-toluidine, the emulsion was deaerated and carefully poured into a cell, formed by two sheets of glass separated by and clamped to a polyvinyl chloride gasket.

After polymerisation was complete, the clamps were removed and the glass peeled away to give a sheet having a highly polished surface, and the sheet was then dried in an oven. After drying, the sheet was pressed between sheets of 'Melinex' polyethylene terephthalate film at a pressure of 35 bar for approximately 2 min to give a sheet of about 14 mm thickness having skins approximately 2.0 mm thick. The sheet was then transferred to an oven maintained at 160°C. After about 30 min the sheet was removed from the oven and quickly transferred and clamped to the flange of a box measuring approximately 50 cm square and 20 cm deep, which was connected up to a vacuum pump. The sheet was stretched downwards until it just touched the bottom of the box, whereupon the vacuum was shut off to prevent further stretching. The moulding produced had a shape similar to a wash basin. The moulding was cut in half to expose the cross-section which was seen to be exceedingly uniform. At maximum stretch, the thickness was 10.6 mm and at the lip of the moulding the thickness was 11.8 mm, corresponding to a maximum reduction in thickness of only 10 percent. Equivalent measurements made on a similar moulding made from a solid sheet of polymethylmethacrylate of the same overall weight were 4.6 mm and 6.1 mm respectively showing a maximum reduction in thickness of approximately 25 percent.

EXAMPLE 4

A sheet was prepared in the manner described in Example 3 except that the catalyst was changed, hot water at 60°C was used instead of cold water, and the triethanolamine was omitted and an equivalent weight of sodium hydroxide with respect to the emulsifier had been predissolved in the water which was added to the syrup. The emulsion was catalysed using 0.3 parts by weight of tertiary butyl perpivolate ("Trigonox" 25/75) in place of the benzoyl peroxide and dimethyl-p-toluidine. The cell had been preheated in an oven at 52°C, and after filling with the warm emulsion was replaced in the oven to complete polymerisation. After 1.5 hour, the sheet was demoulded and had a thickness of approximately 18 mm. The sheet was then dried in an oven at 140°C for 3 hour and then pressed between 'Melinex' polyethylene terephthalate film at 35 bar at 160°C for 2 min. After cooling and removing the film, a dull patchy skin was produced, but this was much thinner than that produced in Example 3.

EXAMPLE 5

Example 4 was repeated with the exception that 5 parts by weight of the "Atlac" catalyst was employed and the sheet was pressed at 170°C for 2 min at a pressure 70 bar using polyester film on either side of the sheet as before. On removal of the film a dull surface resulted, which could only be penetrated by a sharp point with difficulty, whereas the unpressed foam could be penetrated quite easily indicating the presence of a very thin skin.

EXAMPLE 6

A slice cut from the dried sheet prepared in Example 3, was pressed with a hand iron at maximum temperature with an overall pressure of about 9 kg, a piece of polytetrafluoroethylene-treated woven glass cloth being placed between the iron and the cellular material as releasing means. After about 2 min, the iron was removed and the slab cooled before removing the cloth. A glossy textured surface was formed having a thickness of approximately 1.5 mm.

We claim:

1. A method for making a cellular article having an integral skin of substantially non-cellular material over at least part of its surface, comprising: providing an emulsion on a molding surface, said emulsion being obtained by emulsifying water with a water-immiscible liquid monomer polymerisable to a thermoplastic material in the presence of an emulsifier therefor to form an emulsion having an aqueous disperse phase which comprises at least 50 percent by weight of the emulsion, polymerising the liquid monomer to form a cellular polymer, drying the outer layer of said polymer over at least part of its surface to remove water therefrom, applying heat and pressure to said layer to raise its temperature above the softening point of the polymer and fuse said layer thereby destroying the cellular structure of the layer, and cooling the fused layer to form an integral non-cellular skin.

2. A method according to claim 1 in which the emulsifier comprises an unsaturated polyester of a bisphenol A epoxy modified glycol and one or more ethylenically unsaturated dicarboxylic acids, the quantity of polyester lying within the range 0.3 to 5 percent by weight of the monomer.

3. A method according to claim 2 in which the polyester has an acid number of at least 25 mg potassium hydroxide per 1 g polyester.

4. A method according to claim 2 in which a basic compound is present in the emulsion in amounts sufficient to substantially neutralise the acid groups of the polyester.

5. A method according to claim 1 in which the polymerisation is initiated at a temperature within the range 10° to 50°C in the presence of sufficient free radicals to provide a rapid but controlled reaction.

6. A method according to claim 1 in which the liquid monomer contains from 5 to 20 percent by weight of an alkyl acrylate having from two to 10 carbon atoms, copolymerisable with the remainder of the monomeric liquid.

7. A method of moulding a sheet of a water-extended polymer by shaping it at a temperature above its softening point where at least part of the surface of the sheet is stretched, comprising first forming an integral skin on at least that part of the surface where stretching occurs, by the method according to claim 1.

8. A method according to claim 1 in which a decorative pattern or ornament is applied to the surface of the polymer prior to the surface layer being fused to form the integral skin.

9. A method according to claim 1 in which during skin formation pressure is applied through a relieved surface so as to emboss the integral skin of the cellular article.

10. A method according to claim 1 wherein the liquid monomer comprises at least 50 percent by weight of methyl methacrylate.

11. An article which has been shaped from a cellular sheet of water-extended polymer having an integral non-cellular skin, when formed by the method of claim 1.

* * * * *